United States Patent
Labonte et al.

(10) Patent No.: US 9,986,269 B1
(45) Date of Patent: May 29, 2018

(54) MAINTAINING STREAM CONTINUITY COUNTER IN A STATELESS MULTIPLEXING SYSTEM

(71) Applicant: Akamai Technologies, Inc., Cambridge, MA (US)

(72) Inventors: Robert Labonte, San Diego, CA (US); Kourosh Soroushian, San Diego, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days. days.

(21) Appl. No.: 15/449,658

(22) Filed: Mar. 3, 2017

(51) Int. Cl.
   *H04N 7/173* (2011.01)
   *H04N 21/236* (2011.01)
   *H04N 21/2343* (2011.01)

(52) U.S. Cl.
   CPC . *H04N 21/23605* (2013.01); *H04N 21/23617* (2013.01); *H04N 21/234336* (2013.01)

(58) Field of Classification Search
   None
   See application file for complete search history.

(56) References Cited

U.S. PATENT DOCUMENTS

| | | | |
|---|---|---|---|
| 6,820,133 B1 | 11/2004 | Grove et al. | |
| 7,111,057 B1 | 9/2006 | Wein et al. | |
| 7,240,100 B1 | 7/2007 | Wein et al. | |
| 7,274,658 B2 | 9/2007 | Bornstein et al. | |
| 7,296,082 B2 | 11/2007 | Leighton et al. | |
| 7,376,716 B2 | 5/2008 | Dilley et al. | |
| 7,472,178 B2 | 12/2008 | Lisiecki et al. | |
| 7,660,296 B2 | 2/2010 | Fletcher et al. | |
| 8,743,906 B2 | 6/2014 | Branam et al. | |
| 8,750,315 B2 | 6/2014 | Dandekar et al. | |
| 9,432,704 B2 | 8/2016 | Mutton et al. | |
| 9,485,456 B2 | 11/2016 | Soroushian et al. | |
| 2004/0017821 A1 | 1/2004 | Chauvel et al. | |

(Continued)

FOREIGN PATENT DOCUMENTS

KR  1020110137598 A  12/2011

OTHER PUBLICATIONS

U.S. Appl. No. 15/360,170, filed Nov. 23 2016, available in IFW.

(Continued)

*Primary Examiner* — William J Kim

(57) ABSTRACT

Disclosed are systems, methods, and apparatus for maintaining a packet count in stateless multiplexing systems. Multimedia streaming formats employ roll-over packet counters, such as the continuity counter (CC) for stream data associated with a particular packet identifier (e.g., a packetized elementary stream) in an MPEG transport stream. In one embodiment, an input stream is broken into segments of a given duration. Output segments are generated based on input segments (e.g., as in distributed transcoding systems). For a given output segment, additional packets are generated and inserted into the stream to force the packet counter for each packet identifier (PID) to end on a predetermined value. The ending predetermined value is preferably contiguous to the starting predetermined value at which the counter began that output segment. The first packet for a given PID in output segments can thus start the packet counter on a known value—i.e., the starting predetermined value.

17 Claims, 7 Drawing Sheets

(56) References Cited

U.S. PATENT DOCUMENTS

| | | | |
|---|---|---|---|
| 2005/0169303 A1* | 8/2005 | Toma | H04N 7/52 370/466 |
| 2010/0161825 A1* | 6/2010 | Ronca | H04N 21/23424 709/231 |
| 2011/0138429 A1 | 6/2011 | Schade et al. | |
| 2011/0173345 A1 | 7/2011 | Knox et al. | |
| 2012/0265853 A1 | 10/2012 | Knox et al. | |
| 2013/0117418 A1 | 5/2013 | Mutton et al. | |
| 2014/0269776 A1 | 9/2014 | Bomfim et al. | |
| 2015/0020135 A1* | 1/2015 | Frusina | H04N 21/4621 725/116 |
| 2015/0078242 A1 | 3/2015 | Lee et al. | |

OTHER PUBLICATIONS

Google Patent translation, printout of KR1020110137598 (cited above in Foreign References section), 8 pages.

Islam, Safiqul M., A HTTP Streaming Video Server with Dynamic Advertisement Splicing, Master of Science Thesis, Royal Inst. of Tech., Mar. 21, 2010; downloaded on Jan. 19, 2017 from http://www.diva-portal.org/smash/get/diva2:508255/FULLTEXT01.pdf, 108 pages.

ISO/IEC, International Std. 13818-1, Information technology—Generic coding of moving pictures and associated audio information—Part 1: Systems, Fifth Edition 2015, 246 pages.

ISO/IEC, Int'l Standard 14496-12, Information technology—Coding of audiovisual objects; Part 12:ISO base media file format, Fifth edition 2015, 248 pages.

Pantos, R. et al., HTTP Live Streaming, draft-pantos-http-live-streaming-20, IETF information Internet-Draft, available at http://datatracker.ietf.org/drafts/current, Sep. 20, 2016, 57 pages.

Recommendation ITU-T H.222.0, Series H: Audiovisual and Multimedia Systems, Infrastructure of audiovisual services—Transmission multiplexing and synchronization, Information Technology, Generic Coding of moving pictures and associated audio information: Systems, Jun. 2012, 228 pages.

Yuste, Lourdes, Next Generation HBBTV Services and Applications Through Multimedia Synchronisation, PhD Thesis, NUI Galway, downloaded Jan. 19, 2017, published Sep. 18, 2015, available http://hdl.handle.net/103795265, 253 pages.

* cited by examiner

| 8 bits | 1 bit | 1 bit | 1 bit | 13 bits | 2 bits | 1 bit | 1 bit | 4 bits |
|---|---|---|---|---|---|---|---|---|
| Sync Byte | Transport Error Indicator | Payload Unit Start Indicator | Priority | PID (Packet Identifier) | Transport Scrambling Control | Adaptation Field Control (Adaptation Field Flag followed by Payload Flag) | | Continuity Counter |

*FIG. 1* (Prior Art)

MAINTAINING STREAM CONTINUITY COUNTER IN A STATELESS MULTIPLEXING SYSTEM

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This application generally relates to multimedia streaming and to distributed data processing systems for encoding, modifying, and delivering such streams.

Brief Description of the Related Art

Multimedia data is generally comprised of one or more video and audio elementary streams which are multiplexed together into a container for delivery. The elementary streams may be digitally compressed to facilitate their storage and distribution. The role of the container typically is to carry timing and synchronization information, enable error detection and allow for various degrees of error recovery. The MPEG transport stream, which is based on ISO/IEC 13818-1, is one such container. The MP4 ISO container, which is based on ISO/IEC 14496-12, is another example of a container. One potential distinguishing factor between these two containers is that MPEG transport stream has been designed for distribution over error-prone environments, such as satellite distribution, and it has some features which help identify lost packets. The MP4 ISO container, on the other hand, is more susceptible to loss and may even be unusable if corruption in specific portions of the container occur.

One feature of the MPEG Transport Stream is the mandatory presence of a 4 bit continuity counter. The continuity counter (CC) is part of the mandatory transport stream header and hence is present in every packet. It increments by a count of 1 for every transport stream packet belonging to a specific data type, as identified by each unique Packet Identifier (PID). For example, PID value 0x0000 is reserved for the program association table, PID value 0x0001 is reserved for the transport stream description table, and other PID values may be reserved for packets carrying compressed audio, compressed video, ancillary data, or a secondary audio channel. A stream of a type of data, such as compressed audio or compressed video, is referred to in the standard as an elementary stream. The stream of packets is referred to as a packetized elementary stream (PES). Typically, a PES is associated with a PID in a one to one relationship. Note that more than PES is often present in a transport stream and that more than one PES of each type may be present in a transport stream.

The function of the CC is to help identify packet loss; if a gap in the CC is detected by a device, such as a transmitter, receiver or a decoder, it can determine that packet loss has occurred upstream. At that point the device may decide to engage in error-recovery actions.

The nature of the CC lends itself to a stateful design. An encoder producing a transport stream can simply maintain a count of the number of packets of each stream that it is producing, and increment the CC appropriately. However, a stateful design is undesirable or impossible to use in systems that allow a switch between encoders during a stream.

There are a variety of important reasons that such a switch may occur. For example, the system may implement failover techniques: if and when a given encoder may experiences an operational error, connectivity error, or other fault, the system can switch responsibility for producing the stream to another encoder. As another example, the system may implement load balancing techniques, such that when a given encoding resource experiences an unexpected increase in network traffic or CPU load, the stream is switched to another, less loaded resource. Further, the system may employ parallel processing techniques, in which one encoder handles a first segment of the transport stream while simultaneously another encoder handles a second segment. The foregoing are important features of modern distributed computing systems, such as a content delivery network. They are particularly important when utilizing shared resources (e.g., machines shared by stream encoding tasks and other tasks handled by distributed computing system).

Because the CC must increase by one for each packet of each PID, and the packetization of an elementary stream associated with that PID is not directly related to the number or duration of a segment of the transport stream that a given machine in a distributed system is handling, a switch between one or more machines could cause an erroneous gap, duplication, or other discontinuity in the CC.

Note that the foregoing consideration applies equally to transcoders, which typically involve decoding (decode stage) and re-encoding (encoder stage), and the term encoder is meant to encompass transcoding. Transcoders transform an input stream according to desired parameters into an output stream. The transformation may relate to the container parameters/format, and/or to the PES streams encapsulated therein.

As a result of the considerations above, it is desirable to use a stateless system when processing multimedia streams. Preferably such a stateless system enables a switch between one or more machines without the preservation or communication of information between them.

The teachings hereof provide novel approaches to the maintenance of a packet counter, such as the CC, in a stateless system. The teachings hereof can be implemented in a wide variety of systems, apparatus, and methods operable thereon to facilitate the contiguous incrementing of a packet counter at specific multiplexing intervals. These and other benefits and improvements will become apparent in view of this disclosure.

SUMMARY

Disclosed herein are systems, methods, and apparatus for incrementing a packet count in stateless multiplexing system. Multimedia streaming formats employ roll-over packet counters, such as the four bit continuity counter (CC) for packetized elementary streams (PES) in an MPEG transport stream. In one embodiment, an input stream is broken into segments of a given duration. Encoders generate output segments based on input segments (e.g., as is done in distributed transcoding systems). In a given output segment, additional packets are generated and inserted into the stream to force the packet counter for each PES stream (as identified by its PID) to end on predetermined value. The additional packets are sometimes referred to as roundoff packets. The ending predetermined value is preferably contiguous to the starting predetermined value at which the counter began in that output segment. As a result, any encoder knows that the counter value for the first packet of a given PID in an output segment should start on a known value—i.e., the starting predetermined value. This facilitates stateless encoder operation as a current packet counter value does not need to be maintained across segments.

By way of concrete example, the starting predetermined value of the packet counter can be zero, and the ending predetermined value can be equal to the maximum value of the packet counter before it rolls over back to zero. The ending predetermined value is achieved by generating and inserting more packets as needed. Any two contiguous values can be used for the starting and ending values.

The teachings hereof facilitate stateless multiplexing. The production of an output stream with a packet counter field can be handled by independent machines without the need for communication between them about packet counter state.

In one non-limiting aspect, there is a method performed by a computer to generate an output stream (e.g., an output transport stream) from input data (e.g., a particular segment of a transport stream with video, audio, PAT, PMT or other data). The output stream can comprise a first plurality of output stream packets associated with a first packet identifier (PID), which can be associated with a given packetized elementary stream (PES). The computer can include at least one microprocessor and memory that stores computer-readable instructions for execution on the at least one microprocessor to perform the method. The method can involve generating the first plurality of output stream packets from the input data, each of the first plurality of output stream packets being associated with the first packet identifier and comprising a continuity counter field; wherein the first plurality of output stream packets comprises an initial packet, one or more successive packets, and a last packet; setting the continuity counter value of the initial packet to a first predetermined value (e.g., zero); setting the continuity counter value for each successive packet so as to implement a roll-over packet counter that is specific to the first packet identifier, where the roll-over packet counter has a maximum value of N before rolling over, N being a second predetermined value; after generating the last packet, generating a set of roundoff packets, each roundoff packet comprising a continuity counter field; setting the continuity counter value for each successive roundoff packet so as to continue the roll-over packet counter from the last packet; wherein the computer determines to generate sufficient roundoff packets such that the last of the set of roundoff packets has a continuity counter value contiguous with the first predetermined value; inserting the set of roundoff packets into the output stream (e.g. appending them to the end of the stream, or placing them somewhere else therein).

In some cases, the computer determines to generate sufficient roundoff packets such that last roundoff packet has a continuity counter value equal to M, wherein M is a third predetermined value different than N.

In some embodiment, a second plurality of output stream packets (e.g., of a different PID/PES than the first) can be generated from the input data, and the roundoff process described can be employed. This second plurality of output packets can then be multiplexed with the first plurality to create a multiplexed stream.

In one case, the input data can correspond to a particular segment of an input stream, and the method further can include receiving the particular segment of the input stream and one or more transcoding instructions that comprise desired parameters of the output stream.

In another non-limiting aspect, there is a distributed system for generating an output stream from input data. The output stream can comprise a first plurality of output stream packets associated with a first packet identifier and a second plurality of output stream packets associated with the first packet identifier. The system can comprise a first computer that has at least one microprocessor and memory that stores computer-readable instructions that, when executed on the at least one microprocessor, instruct the first computer to: (i) receive a first segment of input data and a first transcode request; (ii) generate the first plurality of output stream packets from the first segment of input data, each of the first plurality of output stream packets being associated with the first packet identifier and comprising a continuity counter field; (iii) wherein the first plurality of output stream packets comprises an initial packet, one or more successive packets, and a last packet; (iv) setting the continuity counter value of the initial packet to a first predetermined value; (v) setting the continuity counter value for each successive packet so as to implement a roll-over packet counter that is specific to the first packet identifier, where the roll-over packet counter has a maximum value of N before rolling over, N being a second predetermined value; (vi) after generating the last packet, generating a set of roundoff packets, each roundoff packet comprising a continuity counter field; (vii) setting the continuity counter value for each successive roundoff packet so as to continue the roll-over packet counter from the last packet; (viii) wherein the computer determines to generate sufficient roundoff packets such that the last of the set of roundoff packets has a continuity counter value contiguous with the first predetermined value; (ix) send the first plurality of output stream packets and the set of roundoff packets, in response to the first transcode request. The system can also include a second computer that comprises at least one microprocessor and memory that stores computer-readable instructions that, when executed on the at least one microprocessor, instruct the second computer to: (i) receive a second segment of the input data and a transcode request; (ii) generate the second plurality of output stream packets from the second segment of input data, each of the second plurality of output stream packets being associated with the first packet identifier and comprising a continuity counter field; (iii) wherein the second plurality of output stream packets comprises an initial packet, one or more successive packets, and a last packet; (iv) setting the continuity counter value of the initial packet of the second plurality of output stream packets to the first predetermined value; (v) setting the continuity counter value for each successive packet of the second plurality of output stream packets so as to implement a second roll-over packet counter that is specific to the first second packet identifier, where the roll-over packet counter has a maximum value of N before rolling over, N being the second predetermined value; (vi) after generating the last packet of the second plurality of output stream packets, generating a second set of roundoff packets, each roundoff packet comprising a continuity counter field; (vii) setting the continuity counter value for each successive roundoff packet of the second set of round packets so as to continue the second roll-over packet counter from the last packet of the second plurality of output stream packets; (viii) wherein the computer determines to generate sufficient roundoff packets such that the last of the second set of roundoff packets has a continuity counter value contiguous with the first predetermined value; (ix) send the second plurality of output stream packets and the set of roundoff packets, in response to the second transcode request. The system also can include a third computer that comprises at least one microprocessor and memory that stores computer-readable instructions that, when executed on the at least one microprocessor, instruct the third computer to: direct the first transcode request to the first computer; direct the second transcode request to the second computer; and receive any of load information and status information from each of the first and second computers.

In another non-limiting aspect, there is a method performed by a computer to generate an output stream from input data. The output stream can comprise a first set of one or more output stream packets associated with a first packet identifier and a second set of one or more output stream packets associated with a second packet identifier. The computer can have at least one microprocessor and memory that stores computer-readable instructions for execution on the at least one microprocessor to perform the method. The method can involve generating the first set of output stream packets without maintaining state for a continuity counter. The generation can be performed by generating the first set of output stream packets from the input data, each of the first set of output stream packets being associated with the first packet identifier and comprising a continuity counter field, wherein the first set of output stream packets comprises an initial packet, one or more successive packets, and a last packet; setting the continuity counter value of the initial packet to a first predetermined value; setting the continuity counter value for each successive packet so as to implement a roll-over packet counter that is specific to the first packet identifier, where the roll-over packet counter has a maximum value of N before rolling over, N being a second predetermined value; after generating the last packet, generating a set of roundoff packets, each roundoff packet comprising a continuity counter field; setting the continuity counter value for each successive roundoff packet so as to continue the roll-over packet counter from the last packet; wherein the computer determines to generate sufficient roundoff packets such that the last of the set of roundoff packets has a continuity counter value contiguous with the first predetermined value; and inserting the set of roundoff packets into the output stream. The method can also involve generating the second set of output stream packets while maintaining state for a continuity counter. That generation can be performed by generating the second set of output stream packets from the input data, each of the second set of output stream packets being associated with the second packet identifier and comprising a continuity counter field, wherein the second set of output stream packets comprises an initial packet, one or more successive packets, and a last packet; setting the continuity counter value of the initial packet of the second set of output stream packets to the first predetermined value; setting the continuity counter value for each successive packet so as to implement a roll-over packet counter that is specific to the second packet identifier, where the second roll-over packet counter has a maximum value of N before rolling over, N being a second predetermined value; after generating the last packet of the second set of output stream packets, storing the continuity counter value thereof in memory; using the stored continuity counter value for generating a third set of output stream packets from the input data that are associated with the second packet identifier.

The subject matter described herein has a wide variety of applications in content delivery and distributed and online platform architectures. As those skilled in the art will recognize, the foregoing description merely refers to examples of the invention. It is not limiting and the teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The invention will be more fully understood from the following detailed description taken in conjunction with the accompanying drawings, in which:

FIG. 1 is a diagram illustrating an MPEG transport stream packet;

DETAILED DESCRIPTION

Figure 2:
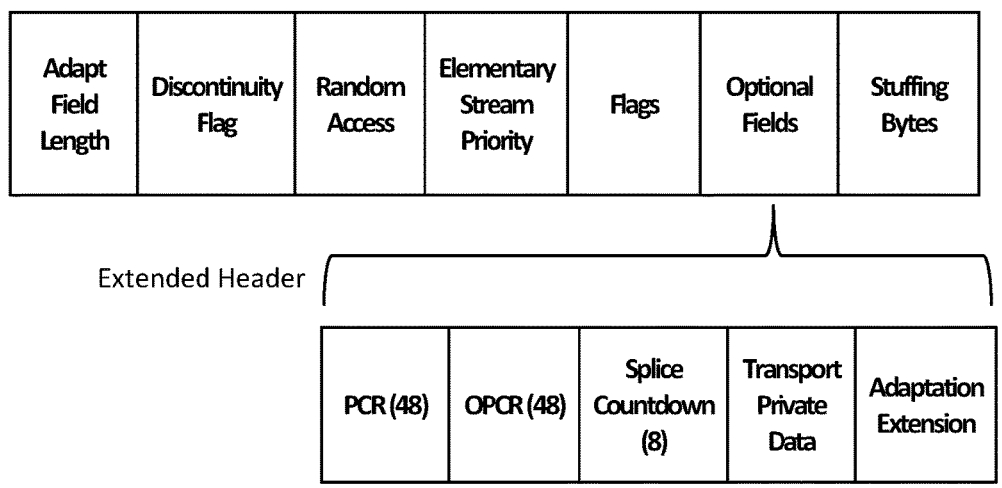
FIG. 2 is a diagram illustrating details of the adaption field control shown in FIG. 1.

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entireties and for all purposes. The term "e.g." used throughout is used as an abbreviation for the non-limiting phrase "for example."

Introduction

Some multimedia standards rely on the segmentation of content into finite durations of time. The HLS (HTTP Live Streaming) standard as described in IETF 'draft-pantos-http-live-streaming-20' is one such standard. It recommends the segmentation of transport streams with specific time durations. For example, these durations may be 2 seconds, 2.002 seconds, 6 seconds, 10 seconds, etc. Segmentation typically occurs based on the number of video frames, and also includes an equivalent duration of audio frames corresponding to the video frame's duration. Ultimately, a segment is terminated based on some specific conditions and a new segment may begin, picking up the elementary audio and video streams from the last segment. Segmentation of content also allows for ease of switching in adaptive streaming conditions. Segmentation also facilitates distribute processing of the content.

The MPEG transport stream is a packet-based multiplexing standard. Sometimes, an MPEG transport stream is referred to in the field as a container format or a container stream. The MPEG transport stream standard provides for a mandatory 4 byte header and a 184 byte payload, encapsulating packetized elementary stream (PES) information and other sub-streams describing the contents of the elementary streams. The PES are encoded in another packet format which encapsulates the raw audio and video elementary data, as well as other ancillary data, such as closed captioning information. Hence, in a multimedia program there is typically a video PES, audio PES, and often, one or more PES packets of other types of data. The audio and video data is typically compressed using a codec, such as h.264 or aac. The transport stream itself may carry other information such as program guide, digital rights management (DRM), and other private information. The packetization of the audio and video PES may end on any transport stream packet boundary, meaning that, in the prior art, the continuity counter (CC) from one HLS segment to the next must be kept in volatile or non-volatile memory and used in creating the next segment, in order to maintain a continuity of counter values for each PES. If a switch to a new machine occurs, then the last continuity counter values for each PES must be communicated between the two machines; otherwise, a break may occur in the uniform packet-by-packet incrementing of the CC for the PES, potentially indicating packet loss to a receiver, even where there is none.

FIG. 1 is a diagram illustrating an MPEG transport stream packet, as known in the art, per ISO/IEC 13818-1, ITU-T H.222.0. FIG. 1 does not show and is not intended to show all the details of a packet; for more information the reader is referred to the standard.

In general, the transport packet header provides the information needed by the receiver to unpack the different stream elements to generate the access units of a selected program. The packet has a header of 4 bytes. The sync byte word (hex code 0x47) indicates a header start sequence, and occurs at least every 188 bytes such that a receiver can lock on to it. The transport error indicator is generally set to zero, unless an uncorrected error is detected by the transmission layer. The Payload Unit Start Indicator (PUSI) is a 1-bit flag which has normative meaning for transport stream packets that carry PES packets or transport stream section data; hence it can signal the start of a PES packet. The Transport Priority can be used to indicate higher priority to certain packets, e.g., for networks where quality of service assignment is possible. The 13 bit Packet identifier (PID) designates the PES to which this packet belongs. For example, it might indicate a particular audio PES or a particular video PES, or particular ancillary data PES. All packetized elementary streams must have unique PID allocations, i.e., a PES is associated with a unique PID. A total of 8175 PID values are allowed for assignment in a stream, whereas other values are pre-assigned. The standard also provides for a NULL packet, which is identified by PID value 0x1FFF. Typically, as currently used in the art, the NULL packet is inserted and deleted when transport streams are multiplexed to provide fine adjustment of bitrate. It also can be used to provide a constant rate for the overall multiplex, or can be inserted in place of program-specific transport stream packets where that program has been deleted from a transport stream. The transport scrambling control indicates if the contents of the transport packet have been scrambled using conditional access techniques. The adaptation field control indicates whether the adaptation field and/or payload are present in the transport stream packet. The field has a two bit value consisting of two flags, the first of which indicates the presence (1) or absence (0) of an adaptation field and the second of which indicates the presence (1) or absence (0) of payload. The adaptation field and the payload, if any, appear later in the packet, after the continuity counter. See, e.g., Figure F.1 of the ISO/IEC 13818-1, ITU-T H.222.0 standard for more details. The payload (if any) carries the data for the PES designated by the PID in the transport packet.

The adaptation field is shown in more detail in FIG. 2. If present, it carries the clock references used by the decoder to recover the timing of the transport stream and recreate the overall system clock, enables buffer management for aligning PES packets and provides other indicators. Buffer management is provided using stuffing bytes, which are a fixed 8-bit value equal to '1111 1111'. The encoder inserts these but they are discarded by the decoder. They are typically used to ensure the transport packet has 188 bytes.

Of note, the adaptation field includes a discontinuity flag that can be set to indicate a discontinuity in the continuity counter field. More about this flag will be discussed later.

Finally, with reference to FIG. 1, the continuity counter (CC) increases by one for each successive packet having the same PID value. Hence, it increments independently per PES. In this way, the CC implements a rollover counter that steps through a set of unique states, with a maximum value of N before rolling over. For example, in the case of a 4 bit counter as specified in the ISO/IEC 13818-1, ITU-T H.222.0 standard, there are 16 states, ranging from a decimal value of 0 (binary 0000) through 15 (binary 1111). The maximum value of the counter (also referred to herein as the roll-over value) is 15.

Stateless Maintenance of Continuity Counter

In the following description, the term "encoder" is used to refer to a computer machine running software as needed to produce the output transport stream. Note that the encoder may be ingesting a transport stream for transport and delivery across the Internet. In addition, the encoder may also be part of a transcoding function that receives a input transport stream with a first format/set of characteristics, decodes it, and produces an output transport stream with a second format/set of characteristics.

In one embodiment, to implement a stateless system while properly incrementing the CC, an encoder can be configured such that all CC values start at a predetermined value of zero at the beginning of each encoding session. Preferably, an encoding session corresponds to a job to produce a particular output segment of an MPEG transport stream. More generally, the output segment can be any segment of a multiplexed stream; the MPEG transport stream is used here for illustration. Starting each session at zero does not require the maintenance of state because it can be implemented as an initialization value for the CC of the initial elementary packet of each PES. Subsequently, normal packetization and multiplexing of PES into output transport packets may take place.

Upon multiplexing of the last packets for each PES in an output segment, additional packets can be generated and inserted, rounding off the CC value for the last packet of each PID/PES to 15. These are referred to herein as "round-off" packets for descriptive convenience. As such, for the next transport stream segment (which may be handled by the same or a different encoder in another encoding session), the CC each PES will again begin from the predetermined value of zero. Because that value will be known across all encoders, each encoder can operate independently without having to know (that is, maintain state for) the CC values in packets that other encoders are producing for the output transport stream.

It is noted that in other contexts, NULL packets (PID value 0x1FFF) are used to shape an output MPEG transport stream for bitrate or alignment purposes, and are discarded by the demultiplexer at the receiver end. The roundoff packets being created and inserted according to the teachings hereof are preferably not such NULL packets with PID value=0x1FFF. Preferably, the roundoff packets have a PID corresponding to the PES for which they are being used to perform CC roundoff. Preferably the roundoff packets include an adaptation field with stuffing bytes sufficient to align/size the transport packet according to the standard, and are otherwise generated in accord with the standard format shown and described with respect to FIGS. 1-2. Further, in a preferred embodiment, the roundoff packets are generated with an adaptation field control of "11" (see FIG. 2). This means that the first bit, which is the adaptation field flag, is set to indicate that the transport packet has an adaptation field, with stuffing bytes and/or other fields. This also means that the second bit, the payload flag, is set to indicate that there is a payload following the adaptation field. The payload would carry the actual PES data. The inclusion of the payload flag means that the CC counter for the PID/PES should be incremented, per the MPEG standard. However, preferably the transport packet does not include payload data. In other words, the payload is preferably empty, even though the payload flag is set to '1'.

In another embodiment, the payload flag can be set to "0", but the CC counter can be incremented nonetheless. This can work with some systems if compatible with the receiver implementation.

In another embodiment, the adaptation field flag can be set to "0", for example if no stuffing bytes or other adaptation field are needed. In sum, the adaptation field control can be set to any value 00 through 11. As noted, "11" is the preferred value. Coordination with a receiver system implementation may be appropriate for standards-non-compliant approaches, but the technique of roundoff nevertheless remains as taught herein.

Figure 3:
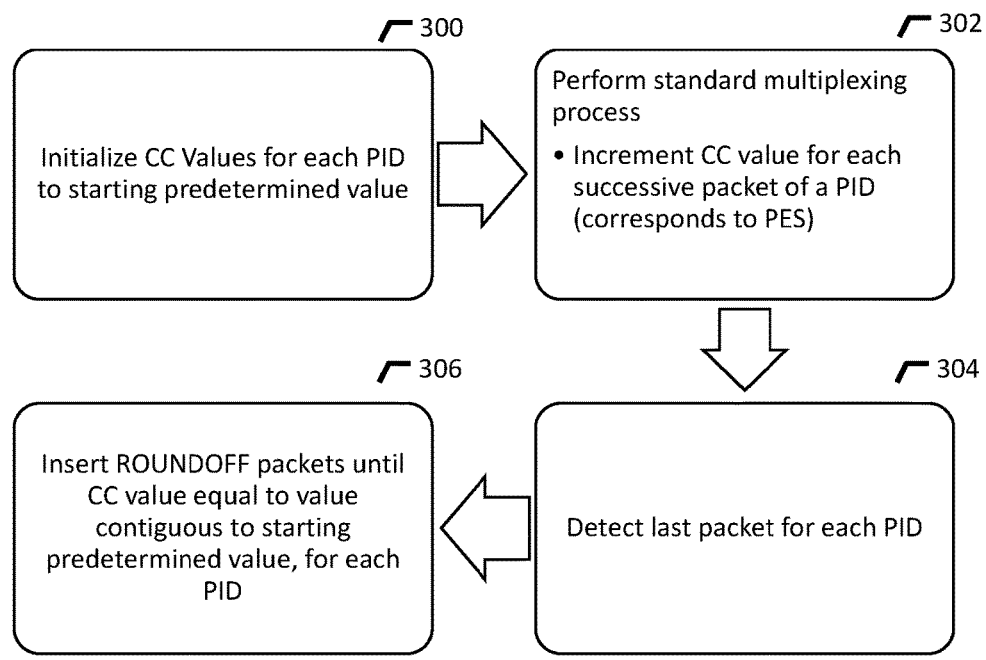
FIG. 3 is a logical flow diagram illustrating a process for maintaining a continuity counter, in one embodiment.

FIG. 3 is a flow diagram illustrating the roundoff process described above. Assume that the process occurs in an encoder that has received a given input segment of a transport stream and that segment contains multiple PES. Assume further the encoder has been tasked to create an output transport stream therefrom. As noted, the input segment may be any size; possible segment sizes are 1 second, 2 seconds, 2.002 seconds, 6 seconds, 6.006 seconds, 10 seconds. FIG. 3 shows the process by which the encoder determines and sets CC values in the transport packets and multiplexes different PES packets together. Other aspects of generating the output transport stream, such as compression of the audio and video data according to codecs (if needed), and other packet formatting and field population, occur according to well-known standards and techniques, which were mentioned previously. One software package that can be used to perform the functions taught herein is FFmpeg.

At step 300, the encoding session begins for a given input segment. The encoder initializes the CC values for each PES to a predetermined value. In a preferred embodiment, using a 4-bit counter, the starting predetermined value is 0. At 302, the encoder produces and multiplexes packets associated with different PES's, incrementing the CC value of each transport packet of each in accordance with standard practice. Note that, as known in the art, the CC is incremented independently with respect to the count for each PID. As noted above, the PID field is used for identify the PES to which a packet belongs to and thereby to increment the corresponding counter. At 304, the encoder detects the last packet of each PID. At 306, for each PID, the encoder inserts roundoff packets until the CC value for the last packet of each PID is equal to a predetermined value that is contiguous with the starting predetermined value. In this example, the starting predetermined value was decimal 0 (binary 0000), so the final predetermined value is decimal 15 (binary 1111). The teachings hereof are not limited to these values, as those skilled in the art will appreciate. For example, in an alternate embodiment still using a 4-bit rollover counter, the starting value could be decimal 5 (binary 0101) and the final value could be decimal 4 (binary 0100). Also, any size packet counter can be used with the teachings hereof.

Figure 4A:
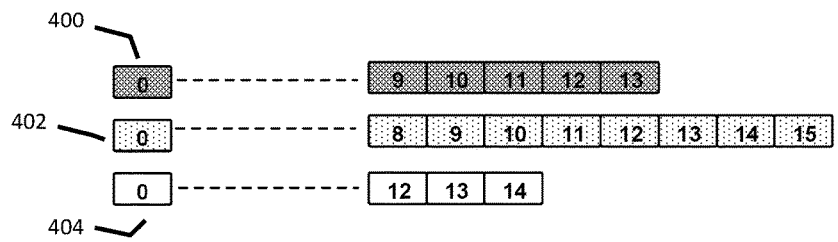
FIGS. 4A-4D illustrate a process of multiplexing packets from three different PES streams and rounding off the continuity counter to reach an ending predetermined value, in one embodiment.

FIGS. 4A-4D illustrate the process of multiplexing packets associated with three different PES and rounding off the CC for each one. Assume that a given output segment of a transport stream contains three separate PES, each associated with a PID. Assume further that each of the three PES start with packets having a CC value of zero and ending at different values between 0 to 15. This is shown in FIG. 4A, with PES 400, 402, and 404 each beginning with packets at a CC value of 0 and ending with packets having CC values 13, 15 and 14, respectively.

Figure 4B:

When the encoder multiplexes the packets from the PES together, the multiplexed output stream appears as a continuous stream of transport packets, as shown in FIG. 4B. (Note that for illustrative convenience FIG. 4B shows the end of the multiplexed stream, omitting earlier packets.)

Figure 4C:
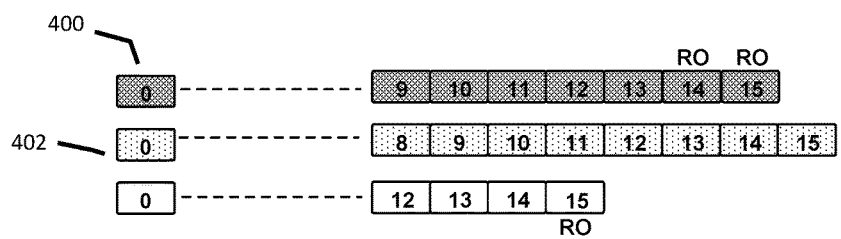

According to the teachings hereof, in a preferred embodiment the encoder determines the CC value of last packet for each PES and then inserts additional roundoff packets to bring the CC counter for each to 15. This is shown in FIG. 4C, with the roundoff packets being indicated with the 'RO' label.

Figure 4D:

In FIG. 4D, the encoder has inserted a total of 3 roundoff packets to set the CC value for all PES to 15. The encoder determined that 2 roundoff packets were needed for PES 400, none for PES 402 as it was already at 15, and 1 roundoff packet was needed for PES 406. Finally, after multiplexing the PES packets together, the outgoing transport stream will appear as shown in FIG. 4D. Note that the roundoff packets preferably are inserted into the output transport stream at the end of all PES packets as shown in FIG. 4D. However, in an alternate embodiment, they can also be placed after the last packet of their corresponding PES (i.e., the roundoff packets for PES 400 placed after the final packet for PES 400, and so on), or elsewhere without limitation. In the above embodiment, it should be noted, the encoder actually examines the PID for a given PES to identify which PES the packet belongs to. In other words, from the encoder's perspective, the packet counter is managed on a PID basis.

The roundoff process introduces a certain amount of processing overhead which may not be desirable for certain types of streams where specific PIDs can be expected to have a small packet count for an encoding session. An example is a PAT or PMT stream. An audio or video stream would be expected, typically, to have a higher packet count. In such situations, an optional hybrid approach may be employed, in which for that less frequent PIDs the CC value is maintained from a previous encoding session, while the more frequent ones undergo the roundoff process described here. The consequences of this approach is that at a point where the encoder loses its internal state, the PIDs which were not undergoing the roundoff process will lose their CC continuity, but the savings in processing overhead may be deemed worthwhile.

Hence, in another embodiment, a semi-stateless system may be implemented where some of the PIDs, preferably those that have a low number of packets, are handled by maintaining state and preserving the CC value from a previous encoding session, while others are handled by starting at a predetermined value of zero at the beginning of each encoding session or otherwise using the techniques herein.

Sample Code

The following example has been included to illustrated the teachings hereof. The following FFmpeg function can be used to demonstrate the rounding off of the CC for a particular PES identified by a particular PID. It assumes FFmpeg libraries; that software is available from www<dot>ffmpeg<dot>org/download.html under the under the terms of and subject to the warranty disclaimers of the LGPLv2.1 license (www<dot>gnu<dot>org/licenses/old-licenses/lgpl-2.1.html) with optional parts under GPLv2 www<dot>gnu<dot>org/licenses/licenses/gpl-2.0.txt. See the last paragraph hereof and appendix for more.

```
static      void      mpegts_write_pes_empty_packets
(AVFormatContext*s, int pid, int cc)
{
    uint8_t buf[TS_PACKET_SIZE];
    uint8_t*q;
    int val, len, header_len, write_pcr, private_code, flags;
    int afc_len, stuffing_len;
    int64_t pcr=-1; /*avoid warning*/
    int64_t     delay=av_rescale(s→max_delay,     90000,
        AV_TIME_BASE);
    int empty_count=15-cc;
    while (empty_count>0) {
        /*prepare packet header*/
        q=buf;
        *q++=0x47;
        val=(pid>>8);
        *q++=val;
        *q++=pid;
        cc=(cc+1) & 0xf;
        *q++=0x30|cc; //payload indicator+CC; Note that
            //value could be binary 00 or 10 or 01
                //as explained in text
        /*header size*/
        header_len=q-buf;
        /*data len*/
        stuffing_len=TS_PACKET_SIZE-header_len;
        /*add stuffing*/
        memmove(buf+4+stuffing_len, buf+4, header_len-4);
        buf[3]|=0x20;
        buf[4]=stuffing_len-1;
        if (stuffing_len>=2) {
            buf[5]=0x00;
            memset(buf+6, 0xff, stuffing_len-2);
        }
        avio_write(s→pb, buf, TS_PACKET_SIZE);
        empty_count--;
    }
    avio_flush(s→pb);
}
```

The teachings hereof are not limited to CC values in MPEG transport streams, nor to HLS (HTTP Live Streaming). They apply to the stateless maintenance of any packet counter, including any packet counter in any multimedia, single-media, or other data stream. Moreover, while a multiplexed MPEG transport stream was used above for explanatory purposes, this is but one embodiment; the teachings hereof apply to any multiplexed stream.

In addition, while the embodiment above utilized a start value of 0, which is the initial state of a 4 bit CC, and a final value of 15, which is equal to the maximum state of the 4-bit CC, the teachings hereof are not limited to those values. The start value could be any predetermined number and the final value a second predetermined number, as long as these values are known within the system such that each separate machine knows where the break-point in the packet counter is, and such that each output segment of the output transport stream being encoded within the system begins and ends on a known set of CC values.

The teachings hereof can be used with any PID streams, including coded audio and video, and also informative packet types such as the program association table (PAT), program map table (PMT), network information table (NIT), conditional access tables (CAT), other program specification information (PSI) tables, and similar types.

System Implementation Context

The teachings hereof may be implemented in virtually any system in which a stateless solution is desired for counters. The processes described herein can be applied during the output stage of a process executing in a computer to encode and multiplex plural PES into a multiplexed output stream.

In one use case, the computer functions as a transcoder. A transcode job controller breaks an input stream into segments and then assigns each segment to one of plural transcoders to be processed in parallel. An assigned transcoder preferably has—in general—a demultiplexing and decoding process for handling an input segment (referred to as the input stage), and an encoding and multiplexing process for producing a desired output segment (referred to as the output stage). The transcoder receives an input segment of some predetermined length of time. It demultiplexes the input stream into the PES, using the PID to identify them. It can decode and re-encode the elementary data in one of more of those elementary streams and re-encode it according to desired codecs and parameters, e.g., to achieve a different bitrate, size, resolution, or otherwise according to desired parameters, prior to delivery to end-user clients. It may perform transformations that do not require decode of the elementary data, such as a frame-rate conversion; it may change or make modifications to the container (multiplexing) format, or add an additional PES into the multiplex, or drop one. The transcoder can multiplex the PES into a multiplexed output segment for a multiplexed stream using a desired container format, such as the MPEG transport stream discussed above.

In another use case, the computer functions to ingest a stream and send it out over a delivery network, such as a CDN, to be delivered to end users. The computer receives an input stream from a source, preferably an input segment of data of some length of time. The input data (e.g., the audio, video) may be relatively lightly compressed. It may receive the various types of data separately. In the output stage, the ingest computer encodes the data (e.g., compressing it according to desired codecs and parameters), creates the PES, and multiplexes them together into a desired container format. Again the teachings hereof can be performed during the output stage.

A system built from such components can take advantage of the stateless nature of the technique in a number of ways. For example, the system may be designed such that a first computer producing an output stream fails over to a second computer when an error or fault condition occurs. Another example is a load balancing system, in which encoding of different output segments is handled by different computers. Another example occurs in distributed data processing. As mentioned above, it is known to transcode input segments of a stream in parallel and the teachings hereof can be applied such that input segments can be handled independently by different transcoders. Examples of distributed computing systems, stream delivery, and transcoding can be found in U.S. patent application Ser. No. 15/360,170, U.S. Patent Publication Nos. 2013/0117418 A1 and 2012/0265853 A1, and U.S. Pat. Nos. 9,432,704 and 9,485,456, the teachings of all of which are hereby incorporated by reference in their entireties for all purposes. As described in those patents and publications, a multiplexed stream may be broken into segments, and a set of distributed resources utilized to handle tasks independently. The processes described herein can be performed, for example, in the transcoders referred to as STR and MTR machines, shown in FIGS. 17 through 22 of U.S. Patent Publication Nos. 2013/0117418 A1. The processes described herein can be performed by the transcoding processes shown in FIG. 23 of U.S. Patent Publication Nos. 2013/0117418 A1.

Masking and Ad-Blocking Use Cases

The teachings hereof can be leveraged to mask stream splices. Stream splicing sometimes occurs when an advertisement is inserted into a stream, for example, or for a channel change. In such situations, the CCs of packets will not be contiguous given the switch to a different source. Usually, a discontinuity flag (shown in FIG. 2 for an MPEG transport stream) is set to indicate this. The receiver then expects and ignores the discontinuity in CC values, rather than treating it as a transmission error. Utilizing the teachings hereof, roundoff packets can be inserted such that there is no discontinuity in the CC value for the spliced PES. In other words, if the last CC value of a first PES is decimal 5, and a second PES being inserted has a CC value of decimal 0, as might occur in a given stream splicing situation, then roundoff packets for CC values decimal 6-15 can be inserted, resulting in no gap in CC values. Thus a modified process in accordance with one embodiment involves determining the beginning CC value of the second PES to be spliced, and inserting roundoff packets such that the first PES's CC value ends on a contiguous number thereto.

Because the discontinuity flag does not have to be set, and the CC values increment as expected, the fact that a splice has occurred can be hidden to the extent the receiver relies the discontinuity bit to detect a splice. This can be useful to circumvent ad blockers that key on this information.

Example of Use in Content Delivery Network

The teachings hereof can be implemented in a type of distributed computer system known in the art and referred to as a "content delivery network" or "CDN". A CDN may be operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, typically content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent nodes that are located in mobile networks, in or adjacent enterprise-based private networks, or in any combination thereof.

Figure 5:
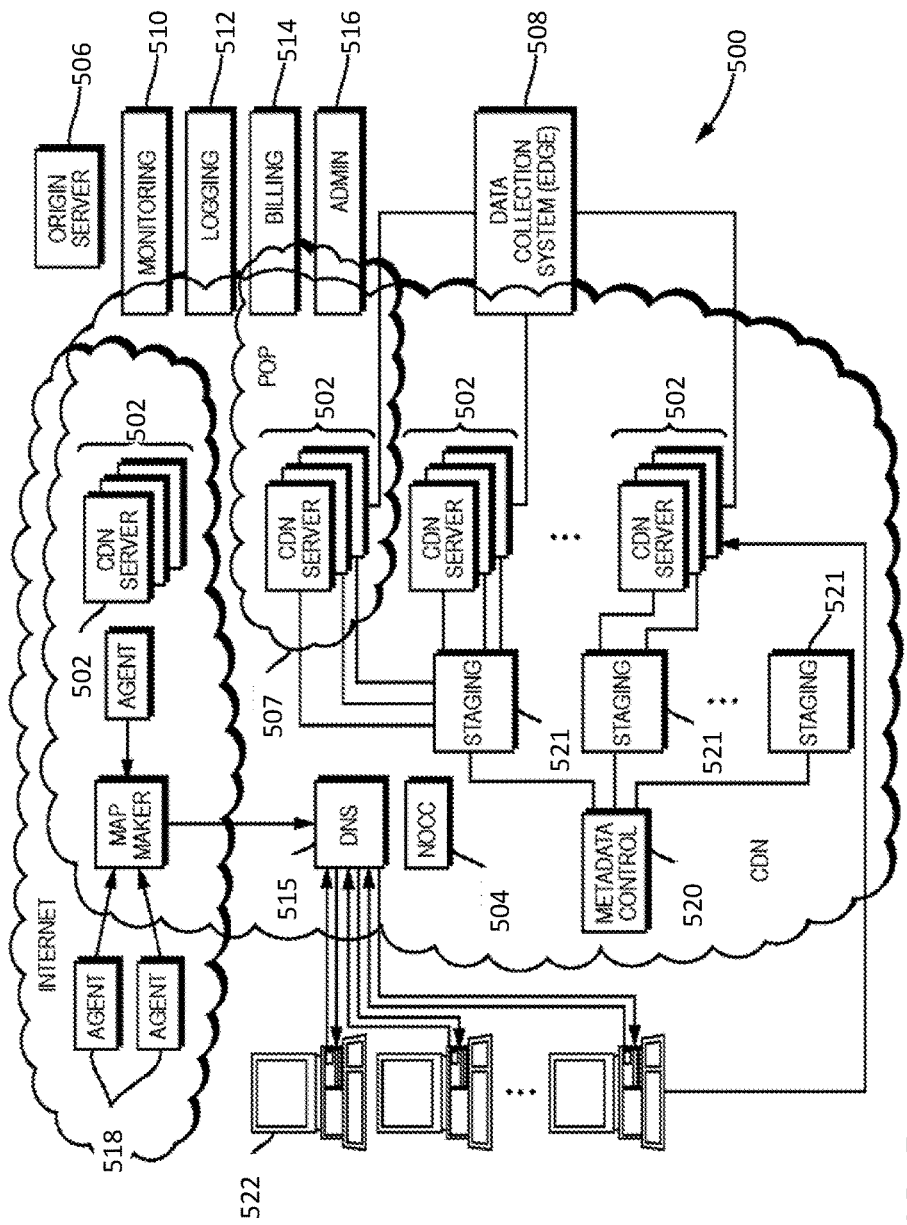
FIG. 5 is a schematic diagram illustrating one embodiment of a distributed computer system configured as a content delivery network, as known in the art.

In a known system such as that shown in FIG. 5, a distributed computer system 500 is configured as a content delivery network (CDN) and is assumed to have a set of machines 502 distributed around the Internet. Typically, most of the machines are configured as servers and located near the edge of the Internet, i.e., at or adjacent end user access networks. A network operations command center (NOCC) 504 may be used to administer and manage operations of the various machines in the system. Third party sites affiliated with content providers, such as web site 506, offload delivery of content (e.g., HTML or other markup language files, embedded page objects, streaming media, software downloads, and the like) to the distributed computer system 500 and, in particular, to the servers (which are sometimes referred to as content servers, or sometimes as "edge" servers in light of the possibility that they are near an "edge" of the Internet). Such servers may be grouped together into a point of presence (POP) 507.

Typically, content providers offload their content delivery by aliasing (e.g., by a DNS CNAME) given content provider domains or sub-domains to domains that are managed by the service provider's authoritative domain name service. End user client machines 522 that desire such content may be directed to the distributed computer system to obtain that content more reliably and efficiently. The CDN servers respond to the client requests, for example by obtaining requested content from a local cache, from another CDN server, from the origin server 506, or other source.

Although not shown in detail in FIG. 5, the distributed computer system may also include other infrastructure, such as a distributed data collection system 508 that collects usage and other data from the CDN servers, aggregates that data across a region or set of regions, and passes that data to other back-end systems 510, 512, 514 and 516 to facilitate monitoring, logging, alerts, billing, management and other operational and administrative functions. Distributed network agents 518 monitor the network as well as the server loads and provide network, traffic and load data to a DNS query handling mechanism 515, which is authoritative for content domains being managed by the CDN. A distributed data transport mechanism 520 may be used to distribute control information (e.g., metadata to manage content, to facilitate load balancing, and the like) to the CDN servers 502.

According to the teachings hereof, the CDN server 502 can host stream encoding/transcoding functions for live or on-demand media delivery, and such functionality can incorporate the CC maintenance techniques described above.

Figure 6:
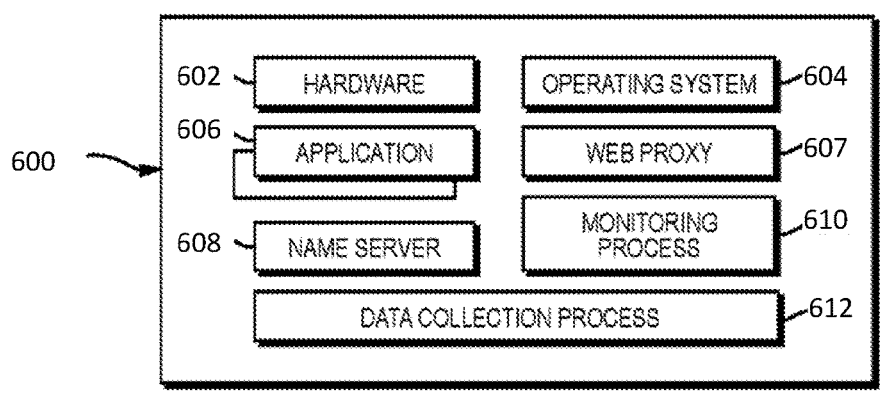
FIG. 6 is a schematic diagram illustrating one embodiment of a machine on which a content delivery server 502 in the system of FIG. 5 can be implemented.

As illustrated in FIG. 6, a given machine 600 in the CDN, such as a server 502, comprises commodity hardware (e.g., a microprocessor) 602 running an operating system kernel (such as Linux® or variant) 604 that supports one or more applications 606. To facilitate content delivery services, for example, given machines typically run a set of applications, such as an HTTP proxy 607, a name server 608, a local monitoring process 610, a distributed data collection process 612, and the like. The HTTP proxy 607 (sometimes referred to as a web proxy) typically includes a manager process for managing a cache and delivery of content from the machine. For streaming media, the machine typically includes one or more media servers, such as a Windows® Media Server (WMS) or Flash server, as required by the supported media formats.

A given CDN server shown in FIGS. 5-6 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The components described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 7:
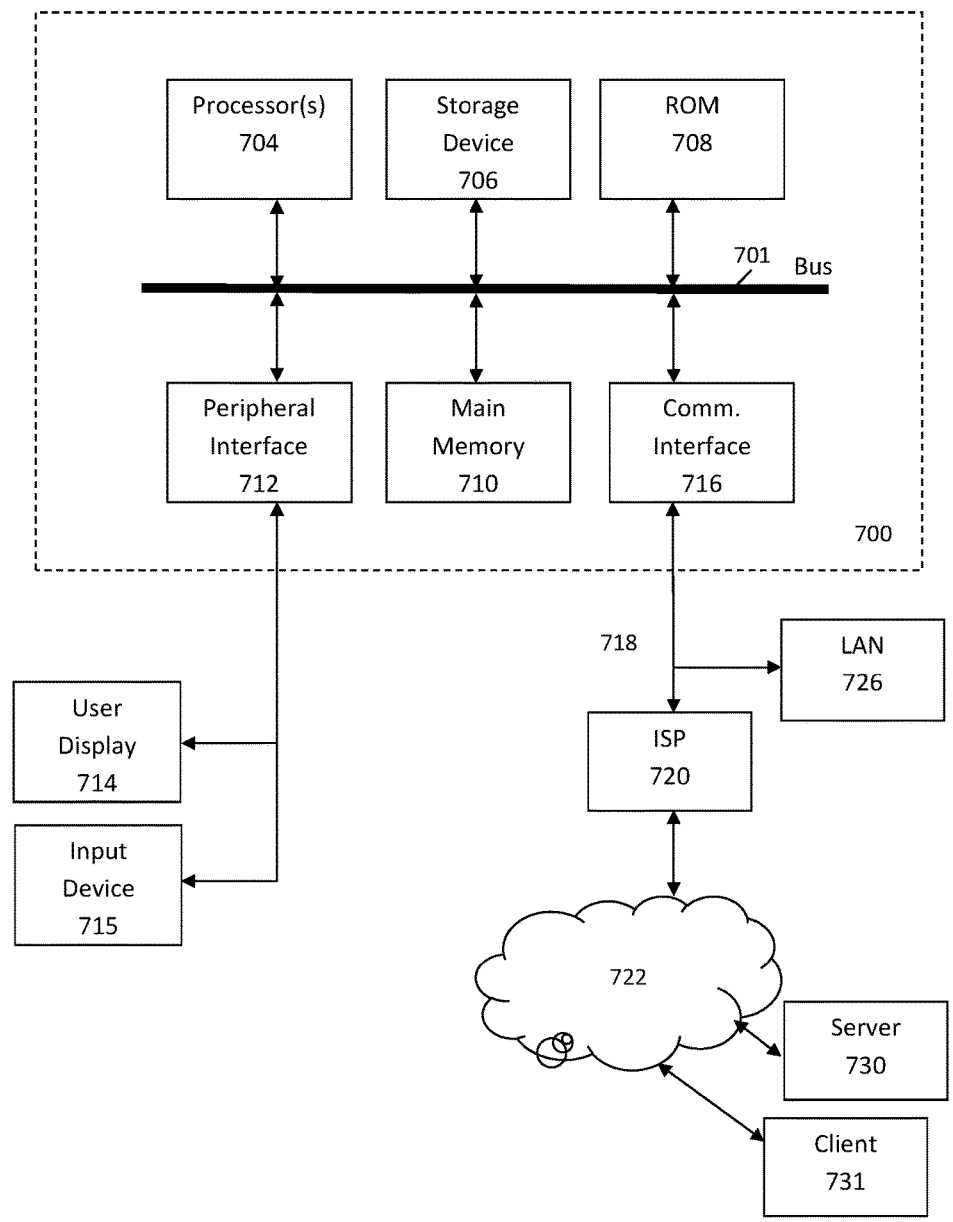
FIG. 7 is a block diagram illustrating computer components that may be used to implement the teachings hereof.

FIG. 7 is a block diagram that illustrates hardware in a computer system 700 upon which such software may run in order to implement embodiments of the invention. The computer system 700 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 700 includes a microprocessor 704 coupled to bus 701. In some systems, multiple processor and/or processor cores may be employed. Computer system 700 further includes a main memory 710, such as a random access memory (RAM) or other storage device, coupled to the bus 701 for storing information and instructions to be executed by processor 704. A read only memory (ROM) 708 is coupled to the bus 701 for storing information and instructions for processor 704. A non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

A peripheral interface 712 communicatively couples computer system 700 to a user display 714 that displays the output of software executing on the computer system, and an input device 715 (e.g., a keyboard, mouse, trackpad, touchscreen) that communicates user input and instructions to the computer system 700. The peripheral interface 712 may include interface circuitry, control and/or level-shifting logic for local buses such as RS-485, Universal Serial Bus (USB), IEEE 1394, or other communication links.

Computer system 700 is coupled to a communication interface 717 that provides a link (e.g., at a physical layer, data link layer, or otherwise) between the system bus 701 and an external communication link. The communication interface 716 provides a network link 718. The communication interface 716 may represent a Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the processor executing code. Such code may be read from or stored on a non-transitory computer-readable medium, such as memory 710, ROM 708, or storage device 706. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 718 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way. FFmpeg software, and copyright and trademark rights therein are not owned by the owner of this application. FFmpeg copyright and trademark owner information can be found at www<dot>ffmpeg<dot>org

The invention claimed is:

1. A method performed by a distributed computer system to generate an output stream from an input stream, the output stream comprising output stream packets associated with a first packet identifier (PID), wherein the computer comprises at least one microprocessor and memory that stores computer-readable instructions for execution on the at least one microprocessor to perform the method, and the method comprises:
   A. at a transcode job controller, breaking the input stream into at least two input segments and assigning a first input segment of the plurality of segments to a first transcoder and a second input segment of the plurality of segments to a second transcoder;
   B. upon receipt of the first input segment at the first transcoder, generating a first output segment based on the first input segment, wherein the generation of the first output segment comprises:
      generating a plurality of first output segment packets from the first input segment, each of the plurality of first output segment packets being associated with the first packet identifier and comprising a continuity counter field;
      wherein the plurality of first output segment packets comprises an initial packet, one or more successive packets, and a last packet;
      setting the continuity counter value of the initial packet to a first predetermined value;
      setting the continuity counter value for each successive packet so as to implement a roll-over packet counter that is specific to the first packet identifier, where the roll-over packet counter has a maximum value of N before rolling over, N being a second predetermined value;
      after generating the last packet, generating a set of first roundoff packets, each first roundoff packet comprising a continuity counter field;
      setting the continuity counter value for each successive first roundoff packet so as to continue the roll-over packet counter from the last packet; wherein the first transcoder determines to generate sufficient first roundoff packets such that the last of the set of roundoff packets has a continuity counter value contiguous with the first predetermined value;
      inserting the set of first roundoff packets into the first output segment;
   C. upon receipt of the second input segment at the second transcoder, generating a second output segment based on the second input segment, wherein the generation of the second output segment comprises:
      generating a plurality of second output segment packets from the second input segment, each of the plurality of second output segment packets being associated with the first packet identifier and comprising a continuity counter field;
      wherein the plurality of second output segment packets comprises an initial packet, one or more successive packets, and a last packet;
      setting the continuity counter value of the initial packet to the first predetermined value;
      setting the continuity counter value for each successive packet so as to implement a roll-over packet counter that is specific to the first packet identifier, where the roll-over packet counter has a maximum value of N before rolling over, N being the second predetermined value;
      after generating the last packet, generating a set of second roundoff packets, each second roundoff packet comprising a continuity counter field;
      setting the continuity counter value for each successive second roundoff packet so as to continue the roll-over packet counter from the last packet;

wherein the second transcoder determines to generate sufficient second roundoff packets such that the last of the set of roundoff packets has a continuity counter value contiguous with the first predetermined value;

inserting the set of second roundoff packets into the second output segment;

D. providing a switching process to switch responsibility for creating a Riven output segment between the first and second transcoders, each operating in a stateless manner during the production of the output stream, said switch being caused at least in part by a failover routine.

2. The method of claim 1, wherein the first predetermined value is zero, and the first transcoder determines to generate sufficient roundoff packets such that last roundoff packet has a continuity counter value equal to N.

3. The method of claim 1, wherein the first transcoder determines to generate sufficient roundoff packets such that last roundoff packet has a continuity counter value equal to M, wherein M is a third predetermined value different than N.

4. The method of claim 1, wherein the first input segment is any of a: video data, audio data, ancillary data.

5. The method of claim 1, wherein the first input segment is associated with a type and a packet identifier, the type being any of: the Program Association Table (PAT) and the Program Map Table (PMT).

6. The method of claim 1, wherein the first packet identifier is associated with a first packetized elementary stream.

7. The method of claim 6, wherein the first packetized elementary stream includes any of: video and audio data compressed according by a codec.

8. The method of claim 1, wherein the output stream comprises an MPEG stream.

9. A distributed computer system for generating an output stream from an input stream, the output stream comprising a first plurality of output stream packets associated with a first packet identifier and a second plurality of output stream packets associated with the first packet identifier, wherein the system comprises:

A. a first computer that comprises at least one microprocessor and memory that stores computer-readable instructions that, when executed on the at least one microprocessor, instruct the first computer to:
  (i) receive a first segment of the input stream and a first transcode request;
  (ii) generate the first plurality of output stream packets from the first segment of the input stream, each of the first plurality of output stream packets being associated with the first packet identifier and comprising a continuity counter field;
  (iii) wherein the first plurality of output stream packets comprises an initial packet, one or more successive packets, and a last packet;
  (iv) setting the continuity counter value of the initial packet to a first predetermined value;
  (v) setting the continuity counter value for each successive packet so as to implement a roll-over packet counter that is specific to the first packet identifier, where the roll-over packet counter has a maximum value of N before rolling over, N being a second predetermined value;
  (vi) after generating the last packet, generating a set of roundoff packets, each roundoff packet comprising a continuity counter field;
  (vii) setting the continuity counter value for each successive roundoff packet so as to continue the roll-over packet counter from the last packet;
  (viii) wherein the computer determines to generate sufficient roundoff packets such that the last of the set of roundoff packets has a continuity counter value contiguous with the first predetermined value;
  (ix) send the first plurality of output stream packets and the set of roundoff packets, in response to the first transcode request;

B. a second computer that comprises at least one microprocessor and memory that stores computer-readable instructions that, when executed on the at least one microprocessor, instruct the second computer to:
  (i) receive a second segment of the input stream and a transcode request;
  (ii) generate the second plurality of output stream packets from the second segment of the input stream, each of the second plurality of output stream packets being associated with the first packet identifier and comprising a continuity counter field;
  (iii) wherein the second plurality of output stream packets comprises an initial packet, one or more successive packets, and a last packet;
  (iv) setting the continuity counter value of the initial packet of the second plurality of output stream packets to the first predetermined value;
  (v) setting the continuity counter value for each successive packet of the second plurality of output stream packets so as to implement a second roll-over packet counter that is specific to the first second packet identifier, where the roll-over packet counter has a maximum value of N before rolling over, N being the second predetermined value;
  (vi) after generating the last packet of the second plurality of output stream packets, generating a second set of roundoff packets, each roundoff packet comprising a continuity counter field;
  (vii) setting the continuity counter value for each successive roundoff packet of the second set of round packets so as to continue the second roll-over packet counter from the last packet of the second plurality of output stream packets;
  (viii) wherein the computer determines to generate sufficient roundoff packets such that the last of the second set of roundoff packets has a continuity counter value contiguous with the first predetermined value;
  (ix) send the second plurality of output stream packets and the set of roundoff packets, in response to the second transcode request;

C. a third computer that comprises at least one microprocessor and memory that stores computer-readable instructions that, when executed on the at least one microprocessor, instruct the third computer to:

direct the first transcode request to the first computer;

direct the second transcode request to the second computer; and provide a switching process to switch responsibility for creating a given output segment between the first and second transcoders, each operating in a stateless manner during the production of the output stream, said switch being caused at least in part by a failover routine.

10. The system of claim 9, wherein the first and second transcode requests each comprise one or more transcoding instructions that comprise desired parameters of the output stream.

11. The system of claim 9, wherein the first predetermined value is zero, and the first computer determines to generate sufficient roundoff packets such that last roundoff packet of the first plurality of output stream packets has a continuity counter value equal to N.

12. The system of claim 9, wherein the first computer determines to generate sufficient roundoff packets such that last roundoff packet of the first plurality of output stream packets has a continuity counter value equal to M, wherein M is a third predetermined value different than N.

13. The system of claim 9, wherein the input stream comprises any of a: video data, audio data, ancillary data.

14. The method of claim 9, wherein the input stream is associated with a type and a packet identifier, the type being any of: the Program Association Table (PAT) and the Program Map Table (PMT).

15. The system of claim 9, wherein the first packet identifier is associated with an elementary stream.

16. The system of claim 9, wherein the first packet identifier is associated with an elementary stream that includes any of: video and audio data compressed according by a codec.

17. The system of claim 9, wherein the output stream comprises an MPEG stream and the first and second pluralities of output stream packets comprise MPEG transport packets.

* * * * *